(12) United States Patent
Chang et al.

(10) Patent No.: US 7,299,664 B2
(45) Date of Patent: Nov. 27, 2007

(54) DEVICE FOR CONTROLLING MOTOR IN WASHING MACHINE AND METHOD FOR CONTROLLING PROCESS OF WASHING MACHINE BY USING THE SAME

(75) Inventors: Bo Young Chang, Seoul (KR); Hee Tae Lim, Kyonggi-do (KR); Byung Keol Choi, Kyonggi-do (KR); Seung Chul Park, Kyonggi-do (KR); Dong Won Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 385 days.

(21) Appl. No.: 10/391,300

(22) Filed: Mar. 19, 2003

(65) Prior Publication Data
US 2003/0221265 A1    Dec. 4, 2003

(30) Foreign Application Priority Data
May 29, 2002    (KR) ............................ 2002-0029840

(51) Int. Cl.
*D06F 33/02* (2006.01)
(52) U.S. Cl. .................................... 68/12.16; 68/12.02
(58) Field of Classification Search ............... 68/12.16, 68/12.02, 133, 140; 318/727, 729, 739
See application file for complete search history.

(56) References Cited

U.S. PATENT DOCUMENTS

| | | | | |
|---|---|---|---|---|
| 1,854,447 A | * | 4/1932 | Chromy | 318/729 |
| 1,866,349 A | * | 7/1932 | Green | 318/829 |
| 1,912,337 A | * | 5/1933 | Kennedy | 318/817 |
| 1,951,733 A | * | 3/1934 | Kniesznor | 323/209 |
| 2,310,874 A | * | 2/1943 | Schiff | 318/772 |
| 2,420,192 A | * | 5/1947 | Rathbun | 318/758 |
| 2,496,937 A | * | 2/1950 | Edwards | 74/336 R |
| 2,634,595 A | | 4/1953 | Olson | |
| 3,252,310 A | * | 5/1966 | Brackman et al. | 68/23.6 |
| 3,401,571 A | * | 9/1968 | Searle | 74/336 R |
| 3,549,969 A | * | 12/1970 | Koichi | 318/751 |

(Continued)

FOREIGN PATENT DOCUMENTS

CN    1241657    1/2000

(Continued)

OTHER PUBLICATIONS

European Patent Office 404 375 Dec. 1990.*

(Continued)

*Primary Examiner*—Frankie L. Stinson
(74) *Attorney, Agent, or Firm*—Greenblum & Bernstein, P.L.C.

(57) ABSTRACT

Device for controlling a motor in a washing machine and a method for controlling a process of a washing machine by using the same, the device including a motor, a power source part for supplying a voltage to the motor, a plurality of torque varying parts parallel to each other and electrically connected to the motor for varying a rotation torque of the motor, a plurality of switching part connected to the torque varying parts respectively and electrically connected to the power source part, a driving part for switching the switching parts, and a controlling part for controlling the driving part so as to vary the rotation torque of the motor according to a mode of user's selection.

6 Claims, 7 Drawing Sheets

U.S. PATENT DOCUMENTS

| | | | |
|---|---|---|---|
| 3,576,041 A | * | 4/1971 | Marshall ................ 8/158 |
| 3,585,475 A | * | 6/1971 | Ban ...................... 318/772 |
| 3,872,694 A | * | 3/1975 | Sikamori et al. ....... 68/12.16 |
| 4,081,726 A | * | 3/1978 | Brimer et al. ......... 318/751 |
| 4,215,303 A | * | 7/1980 | Brimer ................. 318/752 |
| 4,959,573 A | | 9/1990 | Roberts |
| 5,005,383 A | | 4/1991 | Clawson et al. |
| 5,168,172 A | | 12/1992 | Jung |
| 5,335,524 A | * | 8/1994 | Sakane ................. 68/12.04 |
| 5,634,227 A | * | 6/1997 | Lim ..................... 8/158 |
| 5,857,362 A | * | 1/1999 | Oh et al. .............. 68/27 |

FOREIGN PATENT DOCUMENTS

| | | | |
|---|---|---|---|
| EP | 1265351 | | 12/2002 |
| GB | 1484296 | | 9/1977 |
| JP | 53-59814 | * | 5/1978 |
| JP | 59-171584 | * | 9/1984 |
| JP | 62-298698 | * | 12/1987 |

OTHER PUBLICATIONS

English language Abstract of CN1241657.

* cited by examiner

DEVICE FOR CONTROLLING MOTOR IN WASHING MACHINE AND METHOD FOR CONTROLLING PROCESS OF WASHING MACHINE BY USING THE SAME

This application claims the benefit of the Korean Application No. P2002-29840 filed on May 29, 2002, which is hereby incorporated by reference.

BACKGROUND OF THE INVENTION

1. Field of the Invention

The present invention relates to a device for controlling a motor in a washing machine and a method for controlling a process of a washing machine by using the same.

2. Background of the Related Art

In general, the washing machine is a home appliance for washing laundry by friction caused by circulation of washing water occurred as the washing water is forced circulated, and softening action of detergent, and has in general, washing, rinsing, and spinning cycles.

Figure 1:
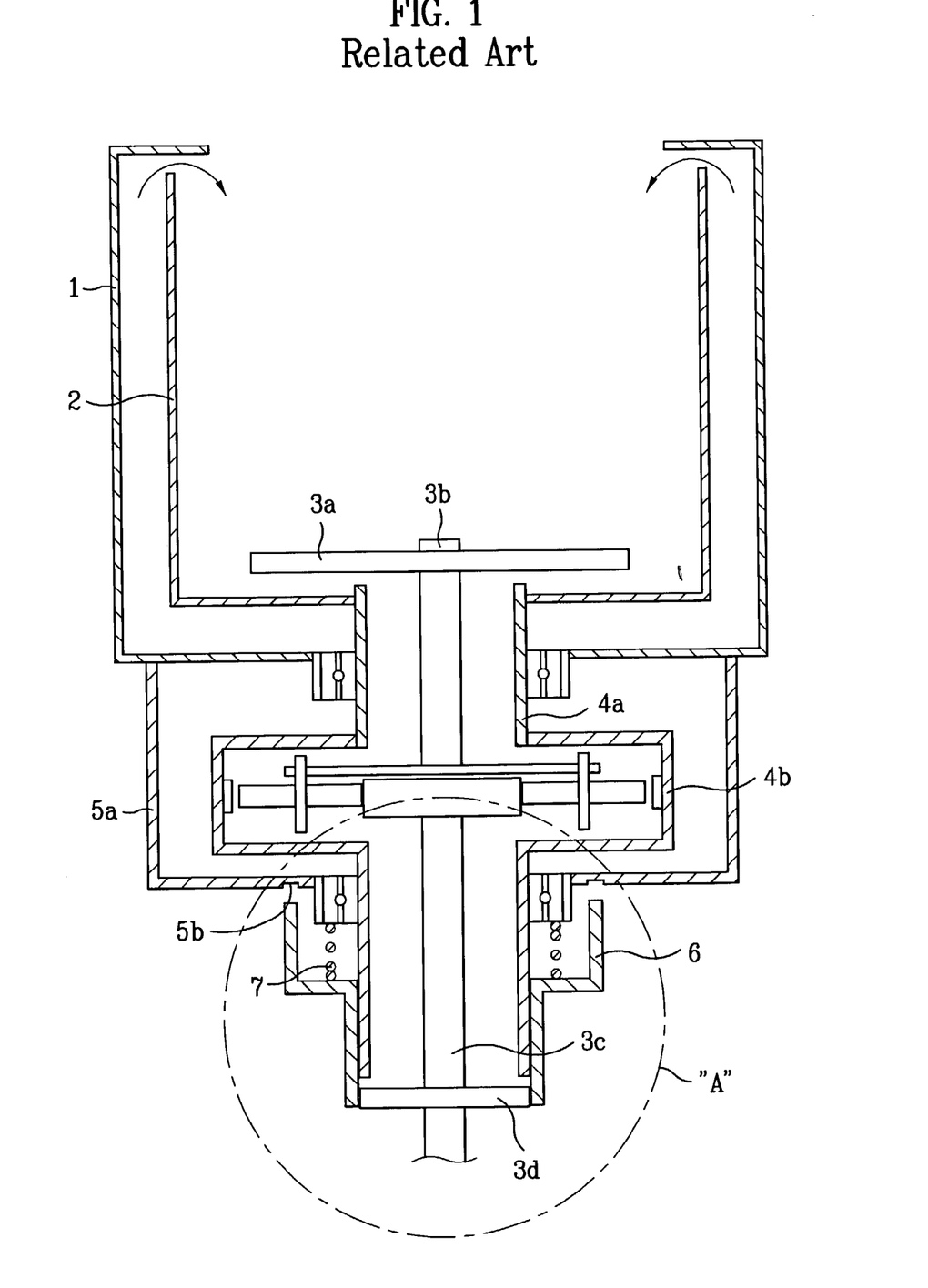
FIG. 1 illustrates a vertical section of a related art washing machine.

The washing machine illustrated in FIG. 1 is provided with a washing shaft divided into an upper washing shaft 3b and a lower washing shaft 3c. The upper washing shaft 3b has a pulsator 3a connected to a top end thereof, and the lower washing shaft 3c has a pulley boss 3d connected to a lower end thereof, to which an induction motor (not shown) is coupled through a belt and a pulley (not shown). The washing shaft 3b and 3c is in a spin shaft 4a and a gear housing 4b, both are hollow.

The washing machine is operative as follows.

Figure 2A:
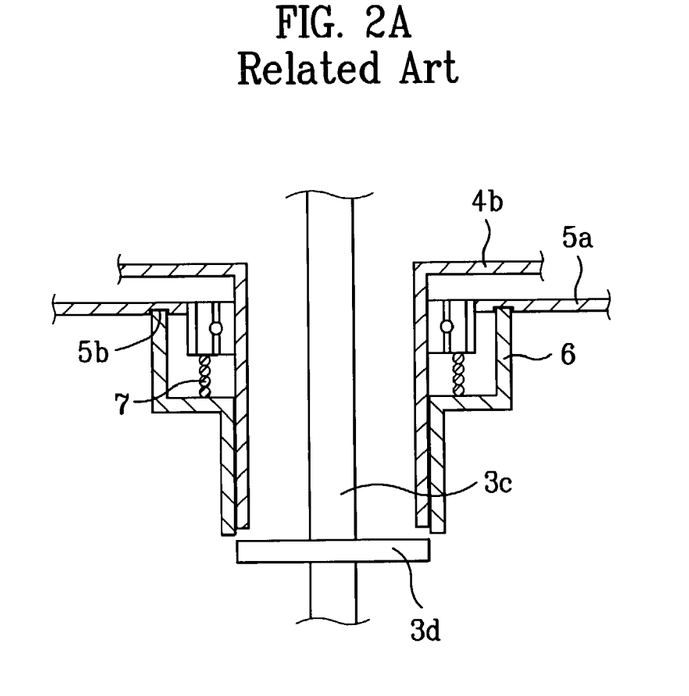
FIGS. 2A and 2B illustrate "A" part in FIG. 1.

The pulsator 3a is designed selectively rotatable depending on the washing cycle and the spinning cycle by operating a clutch 6 by turning on/off a separate motor (not shown). As shown in FIG. 2A, in the washing or rinsing cycle, the gear housing 4b and the pulley boss 3d, i.e., the washing shaft 3b and 3c and the spin shaft 4a, are separated as a separate motor connected to the clutch 6 is turned on, to insert the clutch 6 in a groove and fasten the clutch 6 thereto. Then, as the spin shaft 4a is fixed, and the rotation of the induction motor (not shown) is transmitted to the upper washing shaft 3b in continuation to the lower washing shaft 3c, only the pulsator 3a is rotated in regular/reverse directions, to carry out the washing.

Figure 2B:
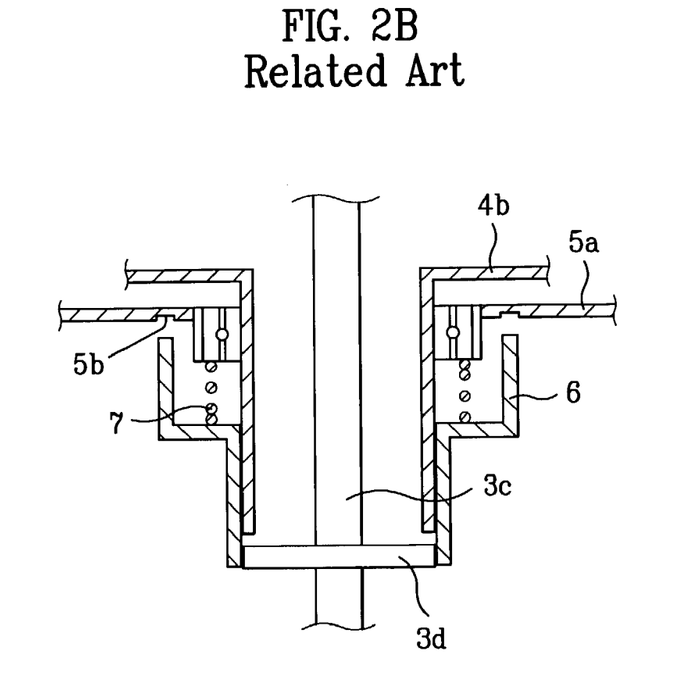

On the other hand, as shown in FIG. 2B, in the spinning cycle, when the motor connected to the clutch 6 is turned off, to separate the clutch 6 from the bearing housing 5a, and couple the gear housing 4b and the pulley boss 3d with the clutch 6, the rotation of the induction motor is transmitted both to the washing shaft 3b and 3c and the spin shaft 4a, to rotate an inner tub 2 and the pulsator 3a at a high speed, thereby extracting water from the laundry.

A driving circuit of the washing machine operative as above will be described.

Though a drawing illustrating a related art washing machine driving circuit is omitted, the related art washing machine driving circuit using an induction motor is provided with a control part for detecting a process mode a user provided thereto, and providing control signals according to the process mode, a driving part for providing a switching signal to drive the induction motor in response to the control signal from the control part, a switching part for switching in response to the switching signal from the driving part, and a condenser for generating a rotation torque of the induction motor according to the switching action of the switching part.

The operation of the driving circuit will be described. When the user provides power to the washing machine, selects a process mode suitable for kind and an amount of laundry introduced into the washing tub, and carries out the washing, the control part (microcomputer) detects them, and provides control signals according to a pertinent algorithm preset therein.

In response to the control signals from the control part, the driving part drives the clutch and the induction motor by means of switching action, to drive the inner tub 2 and the pulsator 3a selectively to carry out a selected process mode. In this instance, the rotation torque of the induction motor is dependent on a capacity of the condenser, and the capacity of the condenser is fixed in designing the driving circuit of the washing machine.

Since the condenser capacity is not variable once fixed in the related art washing machine, unable to vary the torque at a given rotational speed, it has been impossible to implement a variety of algorithm.

Moreover, since the torque of the induction motor is not variable, it has been impossible to cope with load variation following rotation of the pulsator in a washing cycle, and rotation both of the inner tub and the pulsator in the spinning cycle.

SUMMARY OF THE INVENTION

Accordingly, the present invention is directed to a device for controlling a motor in a washing machine and a method for controlling a process of a washing machine by using the same that substantially obviates one or more of the problems due to limitations and disadvantages of the related art.

An object of the present invention is to provide a device for controlling a motor in a washing machine and a method for controlling a process of a washing machine by using the same, in which a rotation torque of a motor is varied with a user set process mode and kind of introduced laundry, for carrying out an optimal washing process, reducing a motor load, and enhancing an energy efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for controlling a motor in a washing machine includes a motor, a plurality of torque varying parts for varying a rotation torque of the motor, a plurality of switching part connected to the torque varying parts respectively, a driving part for switching the switching parts, and a controlling part for controlling the driving part.

The torque varying parts are condensers connected in parallel.

In another aspect of the present invention, there is provided a device for controlling a motor in a washing machine including a motor, a power source part for supplying a voltage to the motor, a plurality of torque varying parts parallel to each other and electrically connected to the motor for varying a rotation torque of the motor, a plurality of switching part connected to the torque varying parts respectively and electrically connected to the power source part, a driving part for switching the switching parts, and a controlling part for controlling the driving part so as to vary the rotation torque of the motor according to a mode of user's selection.

The torque varying parts are condensers, electrically connected between the switching parts.

In further aspect of the present invention, there is provided a device for controlling a motor in a washing machine including a motor, a power source for supplying a voltage to the motor, a first condenser electrically connected to the motor for varying a rotation torque of the motor, a first switch electrically connected to one end of the first condenser and the power source, a second switch electrically connected to the other end of the first condenser and the power source, a second condenser electrically connected between the first switch and the second switch so as to be parallel with the first condenser for varying a rotation torque of the motor, a third switch connected between the second condenser and the second switch, a driving part for switching the first, second and third switching parts, and a controlling part for controlling the driving part so as to vary the rotation torque of the motor according to a mode of user's selection.

The motor is an induction motor, and the first, or second condenser has 5~20 µF capacitance.

In still further aspect of the present invention, there is provided a method for controlling process of a washing machine by using a device for controlling a motor in the washing machine having the motor for selective driving of a pulsator and an inner tub and a plurality of torque varying parts connected in parallel for varying a rotation torque of the motor, including the steps of determining a process mode of user's selection, determining the rotation torque of the motor according to the selected process mode, and carrying out the process mode of the user's selection according to the determined rotation torque of the motor.

The step of determining a process mode of user's selection includes the step of selecting one of cycles from a general washing, a mode change washing, a tub washing, a penetration washing, a general rinsing, a mode change rinsing, a tub rinsing, and a penetration rinsing.

The step of determining the rotation torque of the motor includes the step of controlling charging/discharging of the torque varying parts so as to variably generate the rotation torque of the motor according to the selected process mode.

The 'mode change washing' includes a first step for carrying out a general washing by rotating the pulsator in regular/reverse directions for a preset time period, a second step for carrying out general washing for a preset time period with the rotation torque of the motor increased when a preset time period for the first step is passed, and a third step for carrying out the first step with the rotation torque of the motor reduced when a preset time period for the second step is passed.

The 'tub washing' includes the steps of carrying out a general washing for a preset time period by means of the pulsator, and carrying out a tub washing in which the pulsator and the inner tub are rotated in regular/reverse directions for a preset time period, with the rotation torque of the motor increased when the preset time period for the general washing is passed.

The 'penetration washing' includes the steps of carrying out a general washing for a preset time period by means of the pulsator, and carrying out a penetration washing in which the pulsator and the inner tub are rotated in one direction to generate a pumping water flow for a preset time period, with the rotation torque of the motor increased when the preset time period for the general washing is passed.

The 'mode change rinsing' includes a first step for carrying out spinning for a preset time period after draining, a second step for carrying out a general rinsing by rotating the pulsator in regular/reverse directions for a preset time period after water supply when the preset time period for the first step is passed, a third step for carrying out a general rinsing for a preset time period with the rotation torque of the motor increased when the preset time period for the second step is passed, and a fourth step for carrying out the second step with the rotation torque of the motor reduced when the preset time period for the third step is passed.

The 'tub rinsing' includes the steps of carrying out spinning for a preset time period after draining, and carrying out a tub rinsing in which the pulsator and the inner tub are rotated together for a preset time period with the rotation torque of the motor increased after water supply when the preset time period for the spinning is passed.

The 'penetration rinsing' includes the steps of carrying out spinning for a preset time period after draining, and carrying out the penetration rinsing in which the pulsator and the inner tub are rotated together in one direction with the rotation torque of the motor increased after water supply when the preset time period for the spinning is passed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

The present invention suggests employing a motor controlling device for varying a rotation torque of a washing machine motor, for carrying out optimal washing process, and reducing a motor load, to enhance an energy efficiency.

The present invention includes a motor, a power source part for supplying a voltage to the motor, a plurality of torque varying parts electrically connected to the motor for varying a rotation torque of the motor, a plurality of switching parts respectively connected to the torque varying parts and the power source part electrically, a driving part for switching the switching parts, and a controlling part for controlling the driving part so as to vary the rotation torque of the motor according to a user's set mode. The torque varying parts are connected in parallel, and each of the torque varying parts connects the switching parts in series. The torque varying part includes a condenser and the like.

Figure 3:
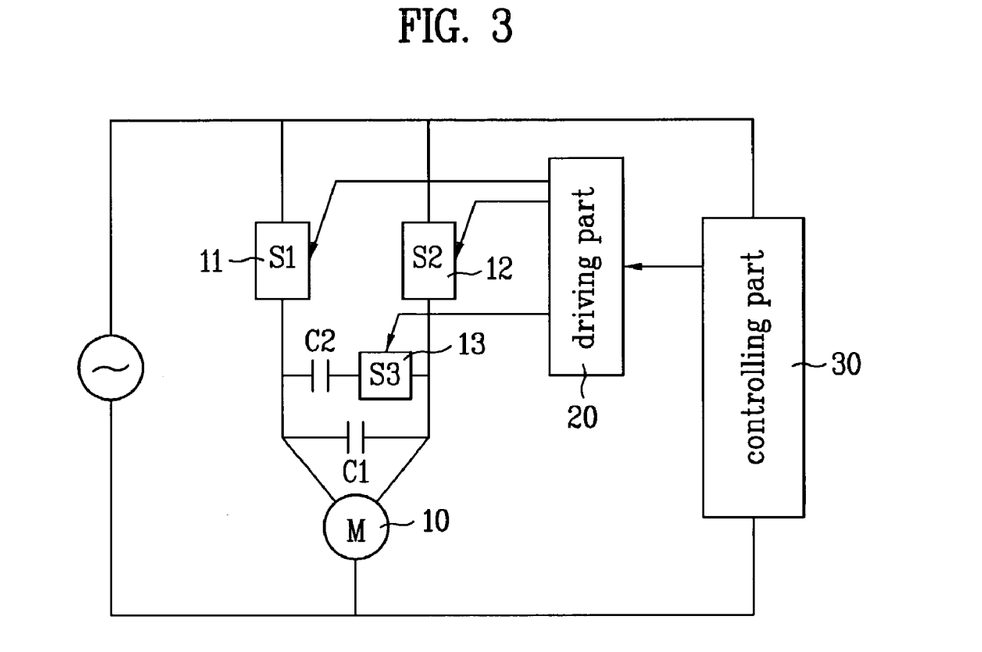
FIG. 3 illustrates a block diagram showing a motor control circuit for a washing machine in accordance with a preferred embodiment of the present invention.

FIG. 3 illustrates a block diagram showing a motor control circuit for a washing machine in accordance with a preferred embodiment of the present invention, wherein two condensers C1 and C2 are used as the torque varying part, and three switches 11~13 are used as the switching part. A motor control circuit for a washing machine in accordance with a preferred embodiment of the present invention will be described, with reference to FIG. 3.

Referring to FIG. 3, the motor control circuit includes a motor 10, a power source for supplying a voltage to the motor 10, first, and second condensers C1 and C2 electrically connected to the motor for varying a rotation torque of the motor, first, second, and third switches 11, 12, and 13 connected to the first and second condensers C1 and C2, a driving part 20 for switching the first, second, and third switches 11, 12, and 13, and a controlling part 30 for controlling the driving part 20 so as to vary the rotation torque of the motor according to a user's set mode.

The first switch 11 is electrically connected to the power source and one end of the first condenser C1, the second switch 12 is connected to the power source and the other end of the first condenser C1, and the third switch 13 is connected between the second condenser C2 and the second switch 12. That is, the third switch 13 is connected to the second condenser C2 in series. The second condenser C2 is electrically connected between the first switch 11 and the second switch 12, so as to be parallel with the first condenser C1. The motor is of an induction type, and the first or second condenser has a capacity of 5~20 µF.

The operation of the motor control circuit for a washing machine will be described.

When the user introduces laundry into a washing tub, sets a process mode proper to kind and amount of the laundry, and starts the washing, the controlling part 30 senses the process mode, and provides a control signal according to a preset algorithm required for the set process mode.

When the driving part 20 turns on the first and second switches 11 and 12 in response to the control signal from the controlling part 30, the motor 10 rotates at a torque consistent to a capacity of the first condenser C1.

Meanwhile, if the driving part 20 turns on all the first to third switches 11~13, the motor 10 rotates at a torque consistent to a sum of capacities of the first and second condensers C1 and C2.

Figure 4:
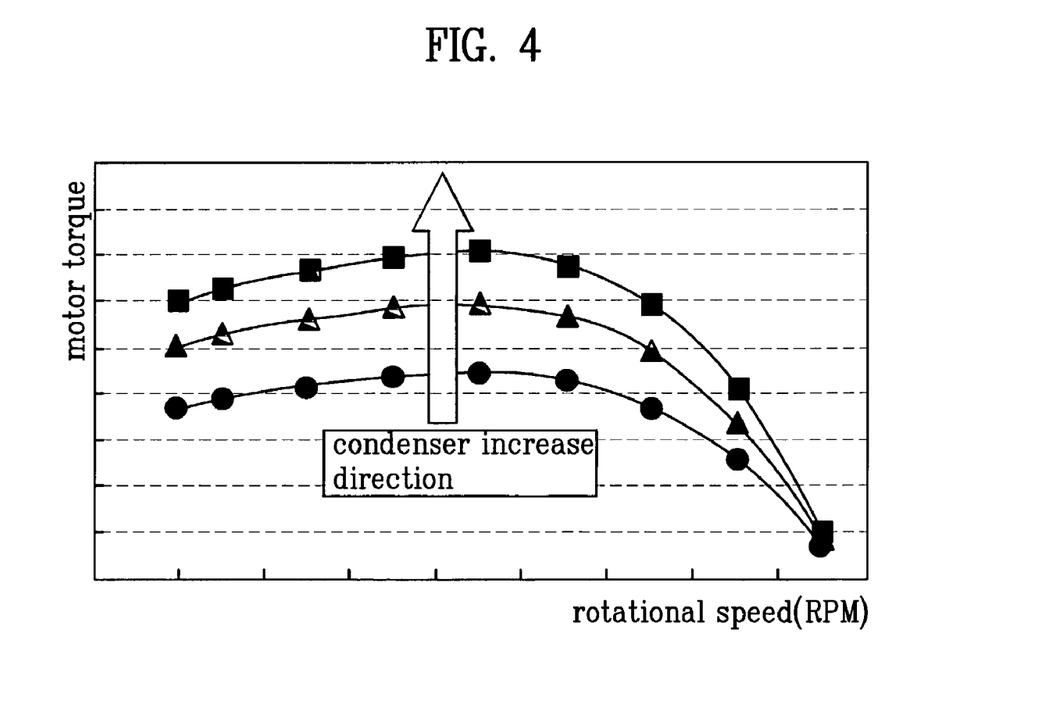
FIG. 4 illustrates a graph showing condenser capacity vs. torque.

Referring to FIG. 4, since the rotation torque of the motor 10 is dependent on capacities of the first and second condensers C1 and C2, the rotation torque of the motor 10 increases the more as the capacities of the first, and second condensers C1 and C2 increase the more.

The controlling part 30 controls turning on/off of the third switch 13 through the driving part 20 for varying the rotation torque of the motor 10 according to the algorithm required for the user's set process mode.

That is, when it is intended to carry out a process mode which has a comparatively heavy load, the controlling part 30 makes the motor 10 to generate a torque according to capacities of the first and second condensers C1 and C2 by turning on the third switch 13.

Opposite to this, when it is intended to carry out a process mode which has a comparatively light load, the controlling part 30 makes the motor 10 to generate a torque according to a capacity of the first condensers C1 by turning off the third switch 13.

A method for controlling a process of a washing machine in accordance with the present invention having the foregoing motor control circuit will be described.

When a user introduces laundry into a washing tub, selects a process mode proper to kind and amount of the laundry, and provides a washing order to a controlling part 30, the controlling part 30 determines the process mode the user selects. This is a process for determining a process algorithm for the user's selection process mode, such as a general washing, a mode change washing, a tub washing, a penetration washing, a general rinsing, a mode change rinsing, a tub rinsing, a penetration rinsing, spinning, and the like.

Then, after the user's selection process mode, i.e., a process algorithm, is determined, a torque of the motor 10 is determined according to the determined process algorithm, and the user's selection process mode is carried out according to the torque. Variation of the torque of the motor 10 according to different process algorithms, and embodiments of the method for controlling a process of the present invention according to the variation of the torque will be described in detail.

First Embodiment

Figure 5:
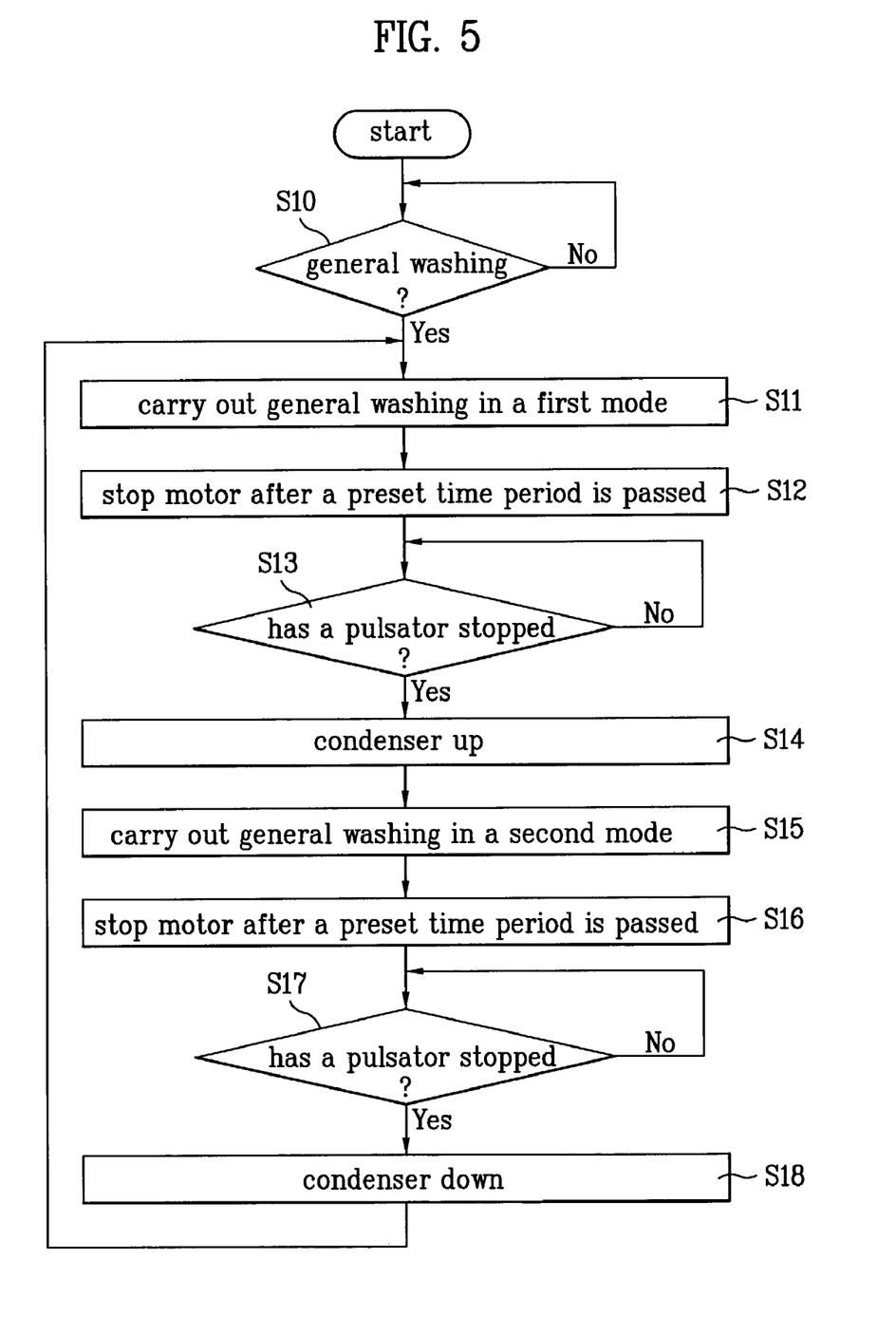
FIGS. 5~8 illustrate flow charts each showing the steps of a method for controlling a process of a washing machine in accordance with first to fourth preferred embodiments of the present invention.

Referring to FIG. 5, when the user's selection process mode is an algorithm including 'a mode change general washing', in the method of controlling 'the mode change general washing', a washing cycle is carried out in a first mode for a preset time period (S10~S11). In the washing cycle, a washing is carried out as rotation of the motor 10 is transmitted to the washing shaft 3b and 3c in a state the clutch 6 is moved up, to rotate the pulsator 3a only.

The motor 10 is made to stop temporarily after the preset time period is passed, stop of the pulsator 3a is determined, and a capacity of the condenser is increased after stop of the pulsator 3a is confirmed (S12~S14).

Then, the torque of the motor 10 is changed according to the increased capacity of the condenser in rotation of the pulsator 3a only in a second mode for a preset time period in carrying out the washing cycle (S15).

In this instance, a torque of the induction motor 10 in the second mode is higher than the first mode. In other words, while the third switch 13 is turned off in the first mode, the third switch 13 is turned on in the second mode to connect the first and second condensers C1 and C2 in parallel, to increase the torque of the motor 10.

After the preset time period is passed, the motor 10 is stopped, and the capacity of the condenser is reduced after stop of the pulsator 3a is confirmed (S16~S18).

Then, the process may proceed to S11 step, to repeat the first mode.

Thus, by changing a torque of the motor 10 in carrying out washing, modes with different torques can be implemented.

Second Embodiment

Figure 6:
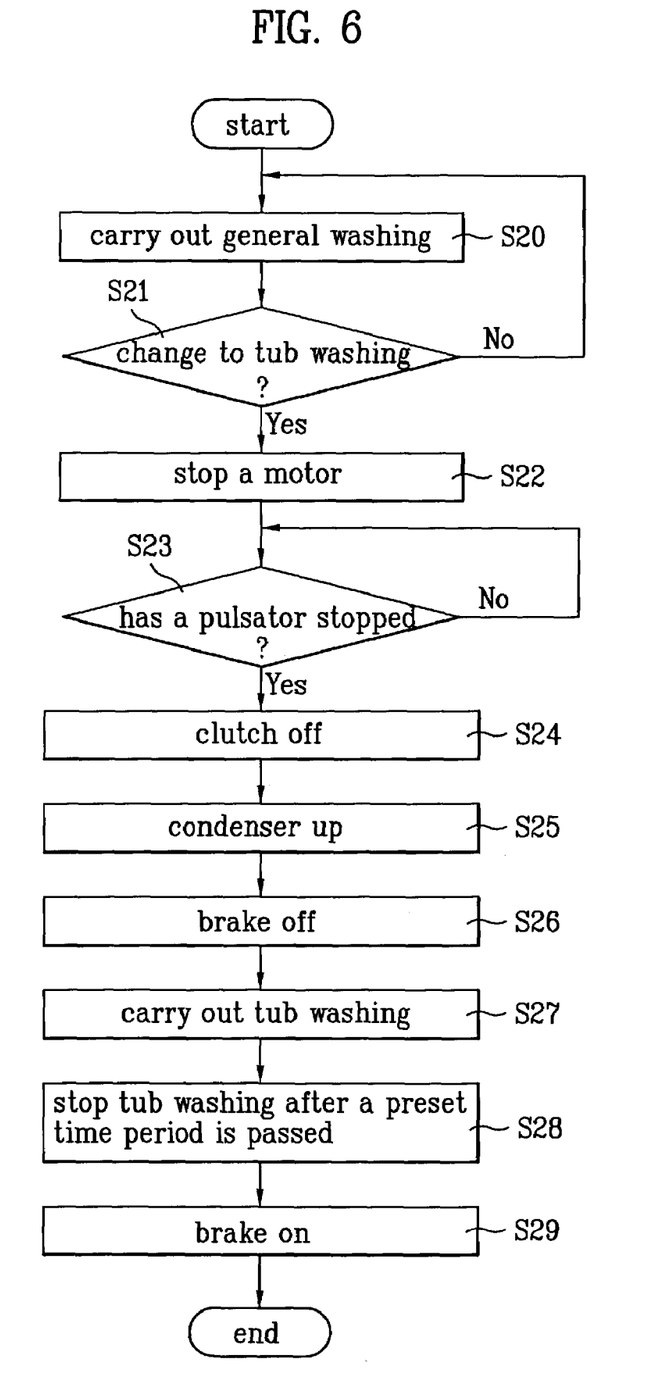

Referring to FIG. 6, when the user's selection process mode is an algorithm including 'a tub washing', in the method of controlling 'the tub washing', a general washing cycle is carried out at first, during which change to a tub washing is determined (S20~S21). In the general washing cycle, a washing is carried out as rotation of the motor 10 is transmitted to the washing shaft 3b and 3c in a state the clutch 6 is moved up, to rotate the pulsator 3a only. In this instance, the third switch 13 is in a turned off state.

Then, when it is a time to change to the tub washing, for an example, when a preset time period of the general washing is passed, the motor 10 is stopped, and after stop of the pulsator 3a is confirmed, the clutch 6 is moved down and, at the same time with this, capacity of the condenser is increased (S22~S25).

Then, after releasing a brake (not shown) having the inner tub 2 held thereto, the tub washing is carried out (S26~S27). The tub washing cycle is a cycle in which both the inner tub 2 and the pulsator 3a are rotated in regular/reverse directions in a state the clutch 6 having the inner tub 2 held thereto is moved down, when the third switch 13 is turned on to connect the first and second condensers C1 and C2 in parallel.

Then, the tub washing is finished when a preset time period for the tub washing is passed, and the brake is activated (S28~S29).

Thus, the tub washing prevents entangling of laundry, and is favorable for washing a small amount of laundry, and laundry with fine texture.

Third Embodiment

Figure 7:
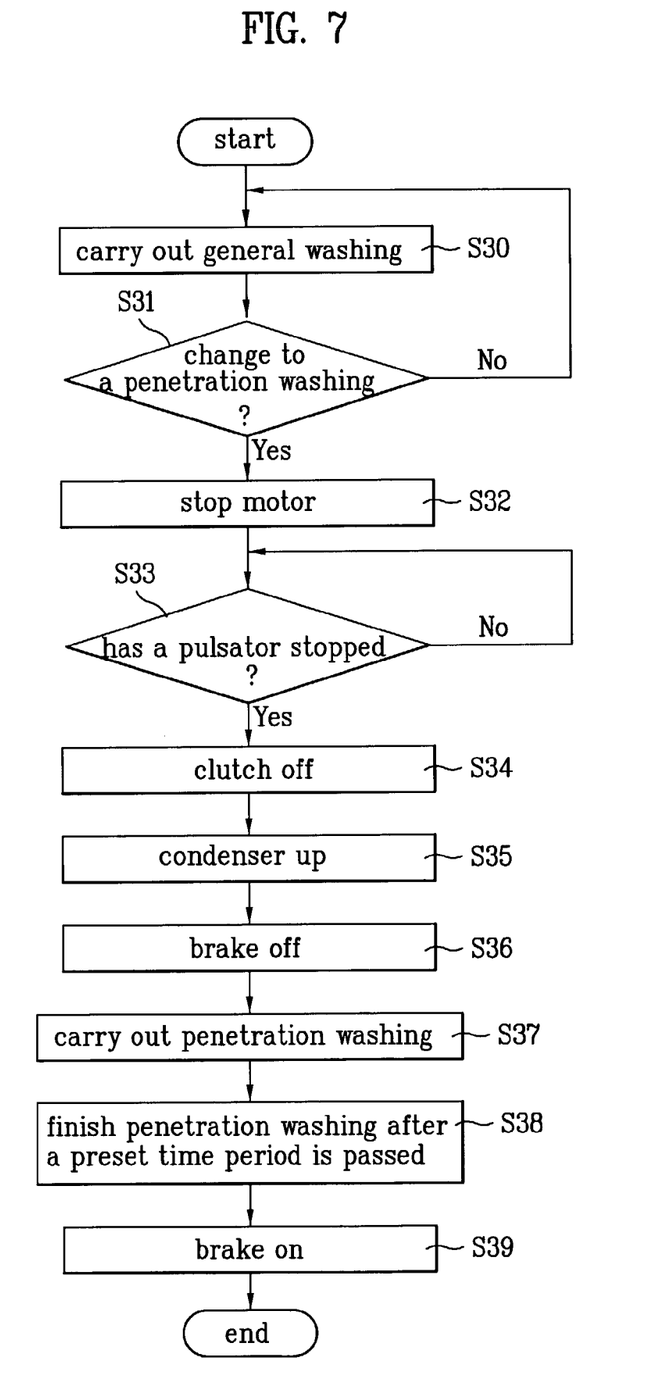

Referring to FIG. 7, when the user's selection process mode is an algorithm including 'a penetration (alpha) washing', in the method of controlling 'the penetration washing', a general washing cycle is carried out at first, during which change to the penetration washing is determined (S30~S31). In the general washing cycle, a washing is carried out as rotation of the induction motor 10 is transmitted to the washing shaft 3b and 3c in a state the clutch 6 is moved up, to rotate the pulsator 3a only in regular/reverse directions. In this instance, the third switch 13 is in a turned off state.

Then, when it is a time to change to the penetration washing (for an example, when a preset time period of the general washing is passed), the motor 10 is stopped, and after stop of the pulsator 3a is confirmed, the clutch 6 is moved down and, at the same time with this, capacity of the condenser is increased (S32~S35).

Then, after releasing a brake (not shown) having the inner tub 2 held thereto, the penetration washing is carried out (S36~S37). The penetration washing cycle is a cycle in which both the inner tub 2 and the pulsator 3a are rotated together in one direction in a state the clutch 6 having the inner tub 2 held thereto is moved down, when the third switch 13 is turned on to connect the first and second condensers C1 and C2 in parallel, and the motor 10 is rotated at a rotational speed enough to cause a pumping water flow from a pumping water passage (reference symbol is omitted) between the outer tub 1 and the inner tub 2 to an inside of the inner tub 2.

Then, the penetration washing is finished when a preset time period for the penetration washing is passed, and the brake is activated (S38~S39).

Fourth Embodiment

Figure 8:
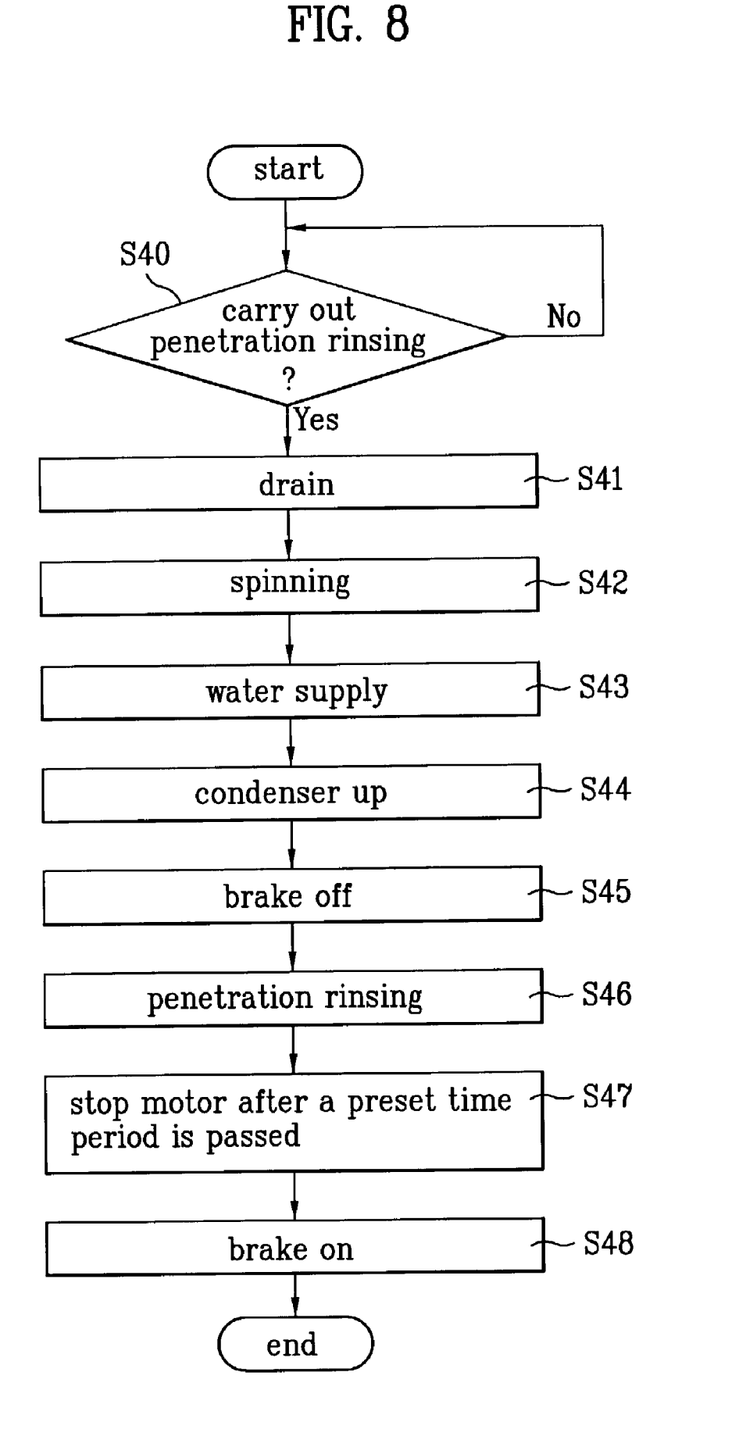

Referring to FIG. 8, when the user's selection process mode is an algorithm including 'a penetration rinsing', in the method of controlling 'the penetration rinsing', a draining, a spinning, a water supply cycles are carried out in succession (S40~S43). Then, a capacity of the condenser is increased, and the penetration rinsing is carried out after releasing the brake (not shown) (S44~S46). In the penetration rinsing, a rinsing is carried out by rotating both the inner tub 2 and the pulsator 3a in one direction to cause the pumping water flow in a state the clutch 6 is moved down. In this instance, the third switch 13 is in a turned on state, to connect the first and second condensers C1 and C2 in parallel.

Then, when a preset time period of the penetration rinsing is passed, the motor 10 is stopped, and the brake is activated (S47~S48).

Other than these, if the user's selection process mode is 'a mode change rinsing', spinning is carried out for a preset time period after draining. Then, water is supplied when the present time period for the spinning is passed, and a general rinsing is carried out for a preset time period by rotating the pulsator in regular/reverse directions. Next, when a preset time period for the general rinsing in which the rotation torque of the motor is increased is passed, the rotation torque of the motor is reduced and the general rinsing is carried out again by rotating the pulsator in regular/reverse directions.

Moreover, if the user's selection process mode is 'tub rinsing', spinning is carried out for a preset time period after draining. Then, water is supplied when the preset time period for the spinning is passed, and a tub rinsing is carried out for a preset time period by rotating the pulsator and the inner tub in regular/reverse directions together.

Thus, the method for controlling a process of a washing machine of the present invention described in detail through various embodiments is designed to implement a variety of process modes by varying a capacity of a condenser that varies a motor torque.

As described, the device for controlling a motor of a washing machine and method of controlling a process of a washing machine by using the same of the present invention have the following advantages.

First, since the rotation torque of the motor can be varied with the user's selection process mode and kind of introduced laundry, that permits an optimal washing process reduction of motor load, an energy efficiency is enhanced.

Second, the implementation of more various process algorithm by varying the motor torque improves a washing performance.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A motor control device in a washing machine comprising:
    a motor;
    a power source that supplies a voltage to the motor;
    a plurality of motor rotation torque varying parts parallel to each other and electrically connected to the motor;
    a plurality of switching parts connected to the motor rotation torque varying parts, respectively, and electrically connected to the power source;
    a driver that switches the switching parts; and
    a driver controller to vary selectively the rotation torque of the motor in the washing or rinsing cycle.

2. The device as claimed in claim 1, wherein the motor rotation torque varying parts are condensers.

3. The device as claimed in claim 1, wherein the motor rotation torque varying parts are electrically connected between the switching parts.

4. A motor control device in a washing machine comprising:
    a motor;
    a power source to supply a voltage to the motor;

a first condenser electrically connected to the motor to vary a rotation torque of the motor;

a first switch electrically connected to one end of the first condenser and the power source;

a second switch electrically connected to the other end of the first condenser and the power source;

a second condenser electrically connected between the first switch and the second switch so as to be parallel with the first condenser to vary a rotation torque of the motor;

a third switch connected between the second condenser and the second switch;

a driver that switches the first, second and third switching parts; and a driver controller to vary selectively the rotation torque of the motor in the washing or rinsing cycle.

5. The device as claimed in claim 4, wherein the motor is an induction motor.

6. The device as claimed in claim 4, wherein the first, or second condenser has a 5~20 μF capacitance.

* * * * *